United States Patent
Lemieux

[11] Patent Number: 5,261,861
[45] Date of Patent: Nov. 16, 1993

[54] FIVE-SPEED TRANSAXLE FOR AUTOMOTIVE VEHICLES

[75] Inventor: George E. Lemieux, Livonia, Mich.

[73] Assignee: Ford Motor Company, Dearborn, Mich.

[21] Appl. No.: 894,674

[22] Filed: Jun. 5, 1992

[51] Int. Cl.$^5$ .................. F16H 57/10; F16H 47/08
[52] U.S. Cl. ..................... 475/275; 475/276; 475/200; 475/202
[58] Field of Search ............ 475/275, 276, 277, 278, 475/200, 202, 203, 204, 206

[56] References Cited

U.S. PATENT DOCUMENTS

| | | | |
|---|---|---|---|
| 3,255,643 | 6/1966 | Hause | 475/202 X |
| 3,446,095 | 5/1969 | Bookout | 475/66 |
| 3,491,621 | 7/1970 | Moan | 475/66 |
| 4,056,988 | 11/1977 | Kubo et al. | 475/66 |
| 4,224,837 | 9/1980 | Crosswhite | 475/56 |
| 4,346,622 | 8/1982 | Pierce | 475/56 |
| 4,368,649 | 1/1983 | Vahratian et al. | 475/66 |
| 4,418,585 | 12/1983 | Pierce | 475/66 |
| 4,452,099 | 6/1984 | Crosswhite | 475/66 |
| 4,454,786 | 6/1984 | Stockton | 475/54 |
| 4,607,541 | 8/1986 | Miura et al. | 475/148 |
| 4,624,154 | 11/1986 | Kraft et al. | 475/66 |
| 4,638,686 | 1/1987 | Lemieux et al. | 475/55 |
| 4,722,242 | 2/1988 | Miura et al. | 475/205 |
| 4,841,804 | 6/1989 | Miura et al. | 475/66 |
| 4,938,097 | 7/1990 | Pierce | 475/72 |
| 4,963,124 | 10/1990 | Takahashi et al. | 475/276 X |
| 5,039,305 | 8/1991 | Pierce | 475/200 X |
| 5,069,656 | 12/1991 | Sherman | 475/276 X |
| 5,167,593 | 12/1992 | Pierce | 475/276 X |

Primary Examiner—Rodney H. Bonck
Assistant Examiner—Daniel Wittels
Attorney, Agent, or Firm—Frank G. McKenzie; Roger L. May

[57] ABSTRACT

An automatic transaxle includes a torque converter, three planetary gear units, friction clutches and brakes, various overrunning couplings and a chain sprocket wheel integrally formed with the ring gear of one of the gear units. The sprocket wheel forms a torque transfer mechanism between the axis of the torque converter and parallel axis about which is located a differential mechanism, a second sprocket wheel, half shafts connected to side bevel gears of the differential, and final drive gearing.

16 Claims, 1 Drawing Sheet

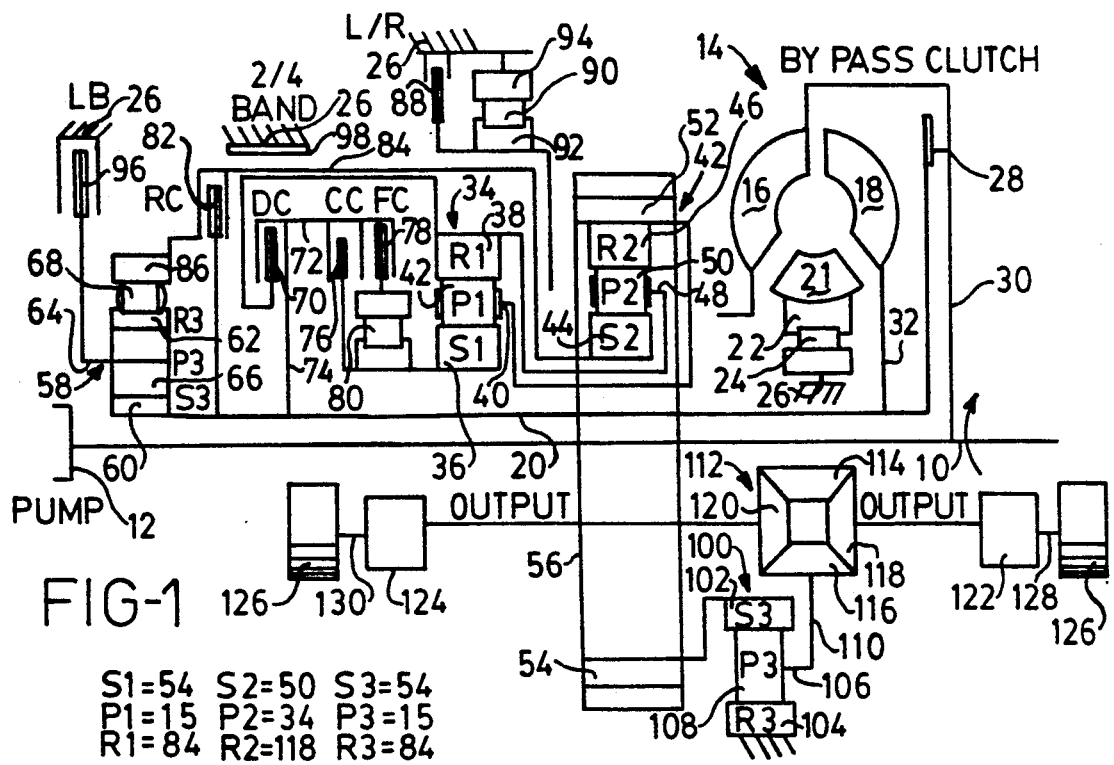
FIG-1
S1=54  S2=50  S3=54
P1=15  P2=34  P3=15
R1=84  R2=118 R3=84
FRICTION ELEMENT APPLICATION
| | 96 | 82 | 76 | 78 | 70 | 88 | 98 | 68 | | 80 | | 90 | |
|---|---|---|---|---|---|---|---|---|---|---|---|---|---|
| | | | | | | | | OWC3 | | OWC2 | | OWC1 | |
| GEAR | LB | RC | CC | FC | DC | L/R | 2/4 | DR | CO | DR | CO | DR | CO |
| M 1 | | | X | X | | X | | X | — | X | — | | |
| M 2 | | | X | X | | | X | X | — | OR | OR | | |
| M 3 | | | X | X | X | | | X | — | OR | OR | | |
| 1 ST | X | | | | | | | X | OR | — | — | X | OR |
| 2 ND | X | | | X | | | | OR | OR | X | OR | X | OR |
| 3 RD | | | | X | | X | | X | OR | OR | OR | | |
| 4 TH | | | X | X | | | | X | OR | OR | OR | | |
| 5 TH | | | | X | X | | X | OR | OR | OR | OR | | |
| RE 1 | | X | | | X | | | — | — | — | — | | |
X = ELEMENT TRANSMITS TORQUE
— = NO RACE RELATIVE ROTATION/NO TORQUE TRANSMITTED
OR = OVERRUNNING
FIG-2
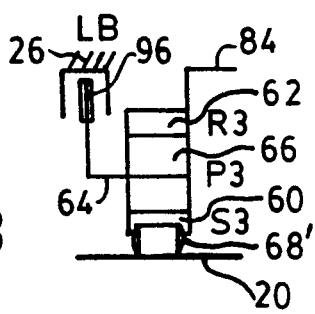
FIG-3

# FIVE-SPEED TRANSAXLE FOR AUTOMOTIVE VEHICLES

BACKGROUND OF THE INVENTION

1. Field of the Invention

This invention relates to the field of automatic transmissions of the type used in motor vehicles. The invention pertains more particularly to a transaxle having three planetary gear units whose elements are controlled by overrunning couplings, friction clutches and friction brakes.

2. Description of the Prior Art

Conventional transaxles include a hydrokinetic torque converter and a gearing system disposed coaxially with the torque converter, that axis located parallel to the axis of an axle differential, connected by half shafts to the traction wheels of the vehicle. Torque is transferred from the axis of the gearing to the axis of the differential by a drive chain mechanism driveably engaged with sprocket wheels, one wheel coaxial with the converter axis, the other wheel coaxial with the differential axis.

In transaxles of this type, it is important that various torque transfer elements be arranged so that they occupy minimal space along the axis on which they are located. The axial spacing is minimized to permit the transaxle to be located in a front wheel drive vehicle wherein the engine and transmission are located in a compartment restricted in the transverse or lateral direction by vehicle styling requirements.

When torque multiplication gearing portions of the transaxle are located on an axis parallel to the axis of the torque converter, the packaging considerations are different from those of a transaxle in which the torque transfer elements are located on a common axis with the torque converter and engine Frequently torque transfer elements are located on the axis of the torque output shaft rather than on the engine crankshaft so that the torque delivery gearing is offset laterally or overlaps the engine crank shaft, thereby reducing the overall axial dimension of the transaxle and engine assembly. When the torque delivery gearing is located on a common axis with the torque converter and engine, this overlapping and offset disposition of the gearing with respect to the engine cannot be accomplished. Thus, the problem of reducing the overall axial dimension of the torque converter and gearing, friction clutches, friction brakes and overrunning couplings requires an alternate solution.

In transaxles of this type where a chain drive mechanism is used to transfer torque between parallel axis, the drive chain is located between the torque multiplication gearing and the torque converter. This arrangement unnecessarily increases the overall dimension of the transaction and engine assembly. This shortcoming in the use of available space virtually precludes the use of a third planetary gear set that might be used to produce a fifth forward speed ratio.

U.S. Pat. No. 4,938,097 describes a transaxle having two planetory gear units for producing forward speed ratios and a reverse drive ratio. One of the planetary gear units is nested within the space defined by a sprocket wheel, engaged by a drive chain that transmits torque from the axis of the gearing to the axis of a differential mechanism.

SUMMARY OF THE INVENTION

In a transaxle for a motor vehicle a hydrokinetic torque converter connects an engine crankshaft to a transmission input shaft. Three planetary gearsets have their elements controlled through operation of various friction clutches, friction brakes and overrunning couplings. The sprocket wheel of a chain drive mechanism surrounding one of the gearsets is driveably connected to the ring gear of that gearset so that the axial dimension of the transaxle is minimized. The ring gear of another gearset is connected through a one-way coupling and a brake drum of the sun gear of the output gears. Parallel torque delivery paths connect the input shaft to the sun gear of another gearset through a coast clutch, located in a parallel torque delivery path that includes a forward clutch and an overrunning coupling in series therewith. A second parallel arrangement of a friction brake and a one-way coupling operates to hold the carrier of the output gearset against rotation.

In overcoming the packaging difficulties associated with arranging the gearing and the associated control elements in a transaxle whose axis is parallel to the transverse axis of a motor vehicle, my invention includes three simple planetary gear units spaced mutually along the transverse axis. Each gear unit includes a sun gear, a ring gear, a carrier and a set of planetary pinions, supported rotatably on the carrier and meshing continually with the sun gear and ring gear. One of the gear units occupies a space surrounded by a sprocket wheel engaged by a drive chain that transmits torque from the axis of the gearing to a parallel axis, about which the output gearing and the differential mechanism are centered. Because the sprocket wheel overlaps the space occupied by this gear unit, there is a substantial reduction in the dimension along the transverse axis required to package the gearing and control elements.

BRIEF DESCRIPTION OF THE FIGURES

FIG. 1 is a schematic diagram of an automotive transaxle according to my invention.

FIG. 2 is a chart that shows the engaged and disengaged state of friction clutches and brakes and the driving and overrunning state of one-way couplings that control operation of the gear elements of the transaxle of FIG. 1.

FIG. 3 is a schematic diagram of an alternate embodiment of the third gear unit of FIG. 1.

DESCRIPTION OF THE PREFERRED EMBODIMENT

Referring first to FIG. 1, an engine crankshaft 10 drives an hydraulic pump 12 that draws fluid from a transmission sump and produces at the pump outlet a source of fluid pressure for a torque converter 14 and an hydraulic actuation and control circuit that communicates with various friction clutches and brakes and controls operation of the elements of planetary gearsets. The crankshaft is mechanically connected to an impeller wheel 16, a bladed rotor supported rotatably for rotation about the axis of the crankshaft. Fluid exiting the impeller drives a turbine 18, a bladed rotor supported rotatably about the crankshaft and connected to an input shaft 20. Located at the exit of the turbine is a stator, a bladed wheel supported rotatably on the outer race 22 of a one-way coupling 24, whose inner race is fixed against rotation by connected to the transmission housing 26."

An hydraulically actuated bypass clutch 28 selectively engages and releases a disc 30, driveably connected to the engine crankshaft. When clutch 28 engages disk 30 it produces a direct mechanical connection between crankshaft 10 and input shaft 20. When clutch 28 is released, then torque converter 14 produces a hydrokinetic connection between the crankshaft and the input shaft.

Each of the planetary gear units is arranged coaxially with crankshaft 10. The first gear unit 34 includes an sun gear 36, a ring gear 38, carrier 40, and a set of planet pinions 42 rotatably supported on the carrier in continuous meshing engagement with the sun gear and ring gear. The second planetary gear unit 42 is located between the first gear unit and the torque converter. It includes a sun gear 44, ring gear 46, carrier 48 and a second set of planet pinions rotatably supported on carrier 48 and meshing continuously with sun gear 44 and ring gear 46. The ring gear is secured to a sprocket wheel 52, rotatably supported concentricly with the crankshaft and aligned axially along the shaft with a second sprocket wheel 54 concentric about an axis parallel to the crankshaft. Both sprocket wheels contain radially outwardly extending teeth that are engaged by the links of a drive chain 56, which transmits torque between the two sprocket wheels. The second planetary gear unit 42 is located within am annular space bounded by sprocket wheel 52 so that the axial dimension along the axis of the crankshaft of gear unit 42 and sprocket wheel is a minimum.

A third planetary gear unit 58 includes a sun gear 60, a ring gear 62, carrier 64 and a third set of planet pinions 66 rotatably supported on carrier 64 in continuous meshing engagement with sun gear 60 and ring gear 62. Sun gear 60 is driveably fixed to input shaft 20 and the outer surface of ring gear 62 forms the inner race of a one-way coupling 68.

Elements of the planetary gearing are mutually interconnected and are connected also through various friction clutches, friction brakes and one-way couplings. Ring gear 38 is driveably connected directly, i.e., without an intermediary friction element or coupling, to carrier 48. Carrier 40 is driveably connected directly to ring gear 46 and sprocket wheel 52. Sun gear 60 is driveably connected directly to input shaft 20.

Direct clutch 70, a hydraulically actuated friction clutch, selectively connects and disconnects the input shaft 20 and ring gear 38 through clutch element 72. Coast clutch 76, an hydraulically actuated friction clutch, selectively engages and releases the input shaft and sun gear 36 through clutch element 72.

A torque delivery path, parallel to the coast clutch and disposed between clutch element 72 and sun gear 36, includes a forward clutch 78, an hydraulically actuated friction clutch, and overrunning coupling 80, which produces a one-way drive connection between sun gear 36 and forward clutch 78.

Reverse clutch 82, an hydraulically actuated friction clutch, selectively connects and releases input shaft 20 and brake drum 84, which is driveably connected to sun gear 44 of the second gear unit 42. Brake drum 84 is secured also to outer race 86 of overrunning coupling 68, whose inner race is fixed to ring gear 62.

Two torque delivery paths have potential to hold carrier 48 against rotation on the transmission housing 26. The first of these includes low/reverse brake 88, an hydraulically actuated friction brake that selectively connects and releases carrier 48 and the transmission housing. Disposed in parallel with the low/reverse brake is a one-way coupling 90, whose inner race is fixed to carrier 48 and whose outer race is fixed to the transmission housing. One-way coupling 90, typical of the other one-way couplings 68, 80, includes a set of rollers that produces a one-way drive connection between the inner race and the outer race.

Carrier 64 of the third gear unit 58 is braked or held against rotation on the transmission housing selectively by engagement and release of low brake 96, a hydraulically actuated friction brake.

Brake band 84 is selectively held against rotation by engagement of the 2/4 brake band 98, whose engaged and disengaged states are controlled by operation of a hydraulic servo that causes the brake band to contract radially, to engage, and to hold brake drum 84 against rotation on the transmission housing.

The transaxle includes final drive gearing 100, a planetary gear set that includes a sun gear 102, a ring gear 104, carrier 106 and a set of planetary pinions 108 rotatably supported on carrier 106 in continually meshing engagement with sun gear 102 and ring gear 104. The sun gear is driveably fixed to the output sprocket wheel 54; ring gear 104 is held fast against rotation on the transmission housing; carrier 106 is driveably connected to the spindle 110 of a differential mechanism 112. Spindle 110 rotatably drives bevel pinions 114, 116, which are in continuous meshing with side bevel gears 116, 120, attached to shafts that extend outwardly and drive constant velocity universal joints 122, 124. The traction wheels of the vehicle 126 are driveably connected by axial shafts 128, 130 to universal joints 122, 124, respectively.

FIG. 3 shows an embodiment in which brake drum 84 is connected directly to ring gear 62 and coupling 68' is located between sun gear 60 and the transmission housing 26. The radially inner surface of sun gear 60 provides the outer race for coupling 68' and the roller produces a one-way drive connection between sun gear 60 and the transmission housing 26.

Operation

Speed ratios are produced automatically by the control system of the transaxle and the operator can manually select the three lowest forward speed ratios by moving the gear selector lever among three drive ranges M1, M2 and M3.

In the automatic range the first speed ratio results by engaging low brake 96 alone. During drive conditions, i.e., when torque is transferred from the engine to the drive wheels, in the first speed ratio of the automatic range, coupling 68 driveably connects ring gear 62 of the third gear unit 58 to sun gear 44 of the second gear unit 42. Carrier 64 is held against rotation by brake 96, sun gear 60 is driven by the engine, and ring gear 62 and sun gear 44 are driven in a reverse direction from that of the input shaft. At the second gear unit, carrier 48 is held against rotation on the transmission housing by the drive connection produced by coupling 90, sun gear 44 is driven, and the output is taken at ring gear 46 and sprocket wheel 52.

During a coast condition in a first speed ratio in the automatic range, couplings 68 and 90 overrun; therefore, the traction wheels drive ring gear 46 through the chain drive mechanism that includes the sprocket wheels 52 and 54. There is no gearset reaction because the one-way couplings overrun. There is no engine braking during a coast condition.

In the M1 range, coast clutch 76, forward clutch 78 and low/reverse brake 88 are engaged. This action causes couplings 80 and 90 to complete a drive connection between their inner and outer races during a drive condition and to overrun during a coast condition, i.e., when torque is transferred from the traction wheels to the engine. During a drive condition in the M1 range, the coast clutch and the parallel torque delivery path that includes forward clutch 78 and coupling 80 driveably connect sun gear 86 to input shaft 20. Carrier 48 and ring gear 38 are fixed against rotation through the parallel combination of low/reverse brake 88 and coupling 90. The output is taken on carrier 40, ring gear 46 and sprocket wheel 52. During a coast condition in the M1 range, the gearset reaction is provided through low/reverse brake 88. Ring gear 46 drives carrier 40, and coast clutch 76 connects sun gear 36 to input shaft 20. Engine braking is available in the M1 range.

An upshift from the first speed to the second speed ratio in the automatic range is made by engaging forward clutch 78. This action causes couplings 80 and 90 to complete a drive connection between their inner and outer races during a drive condition and to overrun during a coast condition. In the drive condition, sun gear 36 is driven by input shaft 20 through the forward clutch and coupling 80, ring gear 34 is held against rotation through operation of coupling 90, and the output is taken at carrier 40, ring gear 46 and sprocket wheel 42. During coast conditions, there is no engine braking.

In the M2 range, coast clutch 76, forward clutch 78 and the 2/4 brake band are engaged. During drive conditions, coupling 80 produces a drive connection between its inner and outer races but does not drive during the coast condition. Input shaft 20 drives sun gear 36 through the forward clutch and coupling 30. The output and sprocket wheel 52 are driveably connected to carrier 40. The gearset reaction is at sun gear 44, which is held by engagement of the 2/4 brake band 98. Engine braking is available during coast conditions in the M2 range.

The third speed ratio in the automatic range results by engaging the forward clutch and the 2/4 brake, which holds sun gear 44 against rotation on the transmission housing. During drive conditions, the input shaft 20 is driveably connected through the forward clutch and coupling 80 to sun gear 36 and the output is taken at carrier 40, ring gear 46 and sprocket wheel 42. This is no engine braking during a coast condition in this range.

In the M3 range, the coast clutch, forward clutch and direct clutch are in engaged. The direct clutch driveably connects input shaft 20 to ring gear 38 and carrier 48. The parallel torque delivery paths through the coast clutch and through forward clutch 78 and coupling 80 driveably connect the input shaft to sun gear 36. Carrier 40, ring gear 46 and sprocket wheel 52 are driven at the same speed and in the same direction as the input shaft 20. In both forward drive and coast conditions there is engine braking because of the continual, drive connection among these components.

The fourth speed ratio in the automatic range is produced substantially the same as the third speed in the M3 range except that coast clutch 76 is not engaged. There is no engine braking during coast conditions.

The fifth speed ratio in the automatic range results when the forward clutch, direct clutch and 2/4 brake are engaged. This action causes couplings 80 and 90 to overrun during drive and coast conditions and coupling 68 is to transmit no torque. The input shaft is connected through the direct clutch to ring gear 38 and carrier 48. Sun gear 44 is held by the 2/4 brake band 98. The output is taken at ring gear 46 and sprocket wheel 52 and engine braking during the fifth speed ratio in the automatic range is available.

Reverse drive results by engaging reverse clutch 82 and low/reverse brake 88. Input shaft 20 drives sun gear 44 through the reverse clutch, carrier 48 is held by brake 88, and the sprocket wheel 52 is driven from ring gear 46. Engine braking is available during a coast condition in the reverse drive range.

The transaxle, modified as shown in FIG. 3, operates identically as described above except for a minor change in the first speed ratio. In the automatic range, coupling 68' overruns during coast conditions and connects the input shaft to sun gear 60 during drive conditions. Brake 26 holds carrier 64, ring gear 62 drives sun gear 44 through brake drum 84, and ring gear 46 drives sprocket wheel 52 with carrier 48 held by coupling 90.

During coast conditions in the first speed ratio of the automatic range, couplings 68 and 90 overrun, carrier 48 is released and carrier 64 is held by low brake 26. There is no drive connection between the engine and traction wheels and no engine braking.

I claim:

1. A multiple speed ratio automatic transaxle for an automotive vehicle having a power source for driving a load, comprising:

input means for driveably connecting the power source and the transaxle;

output means for driveably connecting the transaxle and the load;

a planetary gear system comprising first, second and third planetary gear units, each gear unit having a sun gear, a ring gear, planet pinions meshing with the sun gear and ring gear, and a carrier rotatably supporting the planet pinions, the carrier of the second gear unit being connected driveably to the ring gear of the first gear unit, the carrier of the first gear unit being connected driveably to the ring gear of the third gear unit and the output means, the sun gear of the second gear unit being connected driveably to the ring gear of the third gear unit, the sun gear of the third gear unit being connected driveably to the input means;

first clutch means for driveably connecting and disconnecting the sun gear of the first gear unit and the input means;

second clutch means for driveably connecting and disconnecting the ring gear of the first gear unit and the input means;

third clutch means for driveably connecting and disconnecting the input means and the ring gear of the third gear unit;

fourth clutch means for producing a one-way drive connection between the sun gear of the second gear unit and the ring gear of the third gear unit;

first brake means for holding and releasing the carrier of the second gear unit and ring gear of the first gear unit;

second brake means for holding and releasing the fourth clutch means and the sun gear of the second gear unit; and third brake means for holding and releasing the carrier of the third gear unit.

2. The transmission of claim 1 wherein the first brake means comprises:
   first overrunning coupling means for producing a one-way drive connection between the carrier of the second gear unit and a rotatably fixed surface; and
   a first friction brake arranged in parallel with said first overrunning coupling between the carrier of the second gear unit and said rotatably fixed surface.

3. The transmission of claim 1 wherein the first clutch means comprises:
   a first friction clutch driveably connected to the input means;
   second overrunning coupling means, disposed in series with the second clutch, for producing a one-way drive connection between the sun gear of the first gear unit and the second clutch.

4. The transmission of claim 3 wherein the first clutch means further comprises a coast clutch arranged in parallel with said second overrunning coupling and the first friction clutch between the input means and the sun gear of the first gear unit.

5. The transmission of claim 1 wherein the second brake means comprises:
   a brake drum driveably connected to the fourth clutch means and the sun gear of the second gear unit; and
   brake band means for holding against rotation and releasing the brake drum.

6. The transmission of claim 1 wherein the fourth clutch means comprises a third overrunning coupling means located in a torque delivery path between the sun gear of the second gear unit and the ring gear of the third gear unit.

7. The transmission of claim 1 further comprising:
   a torque converter having an impeller driveably connected to the power source; and
   a turbine hydrokinetically coupled to the impeller and driveably connected to the input means.

8. The transmission of claim 7 wherein the output means further comprises:
   final drive gearing driveably connected to the load;
   a driving element located substantially in the transverse plane of the gear unit that is most proximate to said torque converter, mounted on the axis of said gear unit, and driveably connected to an element of said gear unit; and
   a driven element driveably connected to the final drive gearing.

9. An automatic transmission for an automotive vehicle comprising:
   an input shaft;
   an output shaft disposed parallel to the input shaft;
   a planetary gear system comprising first, second and third planetary gear units, each gear unit having a sun gear, a ring gear, planet pinions meshing with the sun gear and ring gear, and a carrier rotatably supporting the planet pinions, the output means being connected driveably to the ring gear of the second gear unit and to the carrier of the first gear unit, the carrier of the second gear unit being connected driveably to the ring gear of the first gear unit, the carrier of the first gear unit being connected driveably to the ring gear of the third gear unit and the output means, the sun gear of the second gear unit being connected driveably to the ring gear of the third gear unit, the sun gear of the third gear unit being connected driveably to the input means;
   first clutch means for driveably connecting and disconnecting the sun gear of the first gear unit and the input means;
   second clutch means for driveably connecting and disconnecting the ring gear of the first gear unit and the input means;
   third clutch means for driveably connecting and disconnecting the input means and the ring gear of the third gear unit;
   fourth clutch means for producing a one-way drive connection between the sun gear of the third gear unit and input means;
   first brake means for holding and releasing the carrier of the second gear unit and ring gear of the first gear unit;
   second brake means for holding and releasing the fourth clutch means and the sun gear of the second gear unit; and
   third brake means for holding and releasing the carrier of the third gear unit.

10. The transmission of claim 9 wherein the first brake means comprises:
   first overrunning coupling means for producing a one-way drive connection between the carrier of the second gear unit and a rotatably fixed surface; and
   a first friction brake arranged in parallel with said first overrunning coupling between the carrier of the second gear unit and said rotatably fixed surface.

11. The transmission of claim 9 wherein the first clutch means comprises:
   a first friction clutch driveably connected to the input means;
   second overrunning coupling means, disposed in series with the second clutch, for producing a one-way drive connection between the sun gear of the first gear unit and the second clutch.

12. The transmission of claim 9 wherein the first clutch means further comprises a coast clutch arranged in parallel with said second overrunning coupling and the first friction clutch, located between the input shaft and the sun gear of the first gear unit.

13. The transmission of claim 9 wherein the second brake means comprises:
   a brake drum driveably connected to the ring gear of the third gear unit and the sun gear of the second gear unit; and
   brake band means for holding against rotation and releasing the brake drum.

14. The transmission of claim 9 wherein the fourth clutch means comprises a third overrunning coupling means located in a torque delivery path between the sun gear of the third gear unit and the input means.

15. The transmission of claim 9 further comprising:
   a torque converter having an impeller driveably connectable to a power source; and
   a turbine hydrokinetically coupled to the impeller and driveably connected to the input shaft.

16. The transmission of claim 9 further comprising an output drive including;
   final drive gearing driveably connected to the load;
   a driving element located substantially in the transverse plane of the gear unit that is most proximate to said torque converter, mounted on the axis of said gear unit, and driveably connected to an element of said gear unit; and
   a driven element driveably connected to the final drive gearing.

* * * * *